April 18, 1967  S. W. BRIGGS ET AL  3,314,546
CARTRIDGE FILTER
Filed June 2, 1964

INVENTORS
SOUTHWICK W. BRIGGS &
WILLIAM A. BRAZEROL
BY
ATTORNEY

United States Patent Office 3,314,546
Patented Apr. 18, 1967

3,314,546
CARTRIDGE FILTER
Southwick W. Briggs, Chevy Chase, Md., and William A. Brazerol, Washington, D.C. (both % Stone Filter Co., Inc., 900 Franklin St. NE., Washington, D.C. 20017)
Filed June 2, 1964, Ser. No. 372,006
4 Claims. (Cl. 210—457)

This invention relates to pleated paper filters.

When pleated paper filters are exposed to differential pressures in connection with the uses for which they are intended, there is a tendency for the folds of the pleats exposed to the higher pressure to engage one another so as to reduce the effective surface area utilized in the filtering function, resulting in inadequate performance.

It has been proposed in the past, to maintain the outer folds of the pleated medium in spaced relationship by adhesively bonding a cover member thereto over a part or all of their areas of contact.

In order to avoid the cost of adhesive and labor for such purposes, efforts have been directed towards other ways of achieving the spaced relationship of the outer folds of such pleated media. Moreover, by eliminating the use of adhesives, more active filtering surface is retained, since none of the porosity of the medium will be eliminated.

It is among the objects of the present invention to provide a filter comprising a perforated center tube, a permeable paper filter medium having axial pleats defining inner and outer folds, the inner folds engaging the center tube, and a perforated cover member embracing the outer folds, the cover member providing spaced projections maintaining the outer folds in spaced relationship. The projections are preferably integral with the cover member and punched therefrom to form perforations in the cover member. The cover member is preferably formed from paper and the projections are preferably mutually spaced in two dimensions in the blank from which the cover member is formed. The projections preferably engage opposite surfaces of the outer folds of the pleats to maintain them in substantially equally spaced relationship so as to expose a maximum surface area of the pleated filter medium to serve the filtering functions.

A more complete understanding of the invention will follow from a description of the accompanying drawing wherein.

Figure 5:
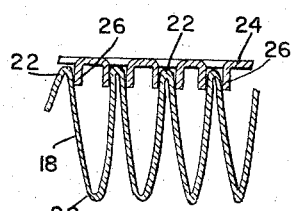
FIG. 5 is a section corresponding to that of FIG. 3 depicting the relationship of a cover member and a pleated medium according to the present invention.
Figure 6:
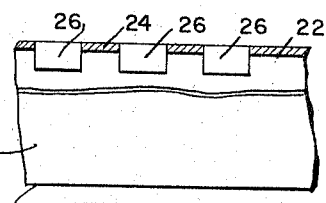
FIG. 6 is a section corresponding to that of FIG. 4 depicting the cover member in cooperation with a pleated medium.
Figure 9:
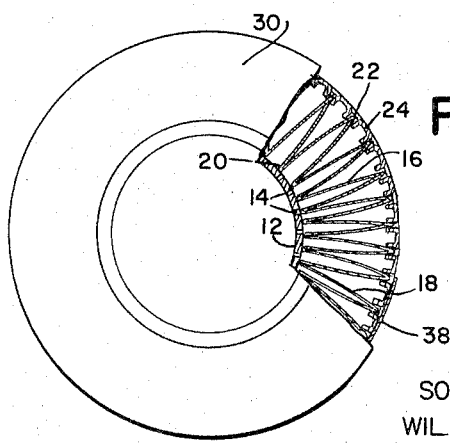
FIG. 9 is a plan view, partially broken away, depicting the relationship of the pleated medium to the other portions of a filter incorporating the present invention.

The filter 10 depicted in the drawing is provided with a center tube 12 containing perforations 14, surrounded by a permeable paper filter medium 16 having axial pleats 18 defining inner folds 20 and outer folds 22. The inner folds 20 engage the center tube 12 and a perforated cover member 24 embraces the outer folds 22, the cover member providing spaced projections 26 engaging the sides of the pleats 18 adjacent their outer folds 22 as best depicted in FIGS. 5 and 9. The projections 26 are depicted as punched from the body of the cover member 24 so as to define perforations 28 through which the flow of the material to undergo filtration is achieved. After the cover member has been applied to the outer folds of the pleated paper medium, it will be suitably secured in place, whereupon the end caps 30 will be applied.

Figure 7:
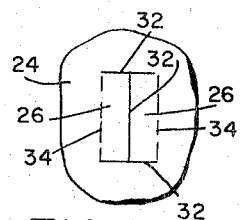
FIG. 7 is a fragmentary detail on an enlarged scale illustrating one form of design for forming projections on a cover member.
Figure 8:
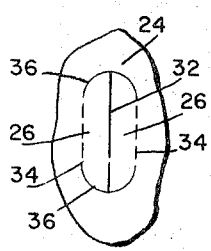
FIG. 8 is a fragmentary detail on an enlarged scale depicting another form of cover member configuration.

In forming the projections and perforations in the cover member, the cover member can be provided with slits 32 and fold lines 34 of rectilinear form as illustrated in FIG. 7, whereupon the material will be deformed until the projections 26 extend substantially at right angles to the body of the cover member 24 by folding along the fold lines 34. In the modification depicted in FIG. 8, curvilinear slits 36 are formed in conjunction with a rectilinear slit 32 so that when the projections 26 are bent along their fold lines 34, there will be less likelihood of tearing. A wide variety of configurations for the projections and perforations are contemplated and the spacing imparted to such projections and perforations can vary as well. A wide variety of materials will lend themselves to use as a cover member of the type contemplated, such as a craft paper of 0.018 inch in thickness, for example. Such cover members can be impregnated in the customary manner, with various materials known in the art such as phenolformaldehyde resins and other resins compatible with the material to undergo filtration. In the case of filters contemplated for the filtration of lubricating oils, the materials employed would be compatible with such oils at such temperatures as might be expected to prevail. Similarly, filters incorporating the present invention can be used for other purposes, and in any case, the materials selected will be compatible with the use intended.

Figure 1:
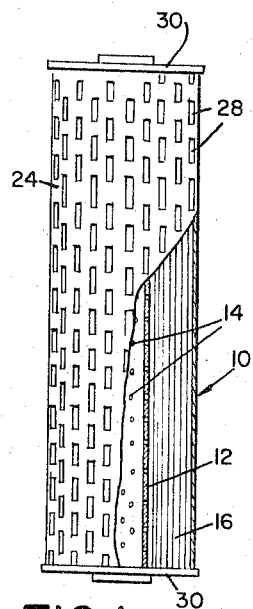
FIG. 1 is an elevation, partially broken away depicting a filter incorporating the present invention.
Figure 2:
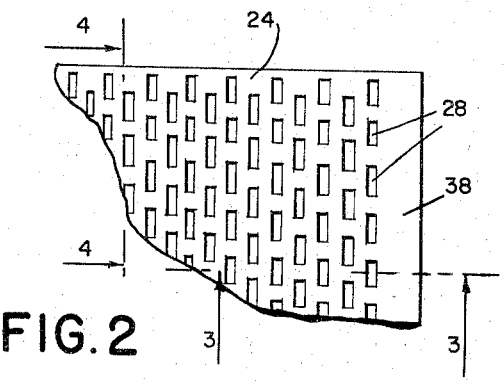
FIG. 2 is a plan view fragmentarily depicting a portion of a cover member according to the invention.
Figure 3:
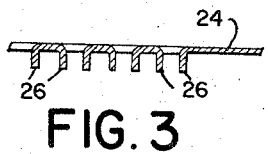
FIG. 3 is a section taken along line 3—3 of FIG. 2.
Figure 4:
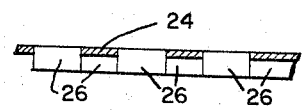
FIG. 4 is a section taken along line 4—4 of FIG. 2.

As shown in FIG. 2, an edge 38 of the cover member 24 contains no perforations. It is intended that such an edge and a corresponding edge parallel thereto will be overlapped and adhesively bonded to form a longitudinal seam between the ends of the cover member after they have been brought together to assume the essentially cylindrical shape depicted in the drawings.

As will be evident from FIG. 9, the outer folds of the pleated paper medium will be retained in substantially equally spaced relationship so as to expose a maximum area of the medium of the material to the filter.

Whereas illustrations of the present invention have been limited in the foregoing specification and in the accompanying drawings, such variations as will be suggested

We claim:

1. A filter comprising a perforated center tube, a permeable paper filter medium having axial pleats defining inner and outer folds, said inner folds engaging said center tube, and a perforated cover member embracing said outer folds, said cover member providing spaced projections straddling and maintaining said outer folds in spaced relationship, said projections being punched from said cover member to form perforations therein.

2. A filter according to claim 1 wherein said cover member is formed from paper.

3. A filter according to claim 1 wherein said projections are mutually spaced in two dimensions.

4. A filter according to claim 1 wherein said projections engage opposite surfaces of said pleats.

References Cited by the Examiner

UNITED STATES PATENTS

| | | | |
|---|---|---|---|
| 2,279,423 | 4/1942 | Vokes | 210—493 |
| 2,837,214 | 6/1958 | Kasten | 210—493 |
| 2,919,807 | 1/1960 | Briggs | 210—493 X |
| 3,049,240 | 8/1962 | Smith | 210—315 X |
| 3,054,507 | 9/1962 | Humbert et al. | 210—457 X |
| 3,116,245 | 12/1963 | McNabb et al. | 210—493 X |
| 3,189,179 | 6/1965 | McMichael | 210—238 |

REUBEN FRIEDMAN, *Primary Examiner.*

C. DITLOW, *Assistant Examiner.*